United States Patent [19]

Sundell et al.

[11] Patent Number: 5,318,933
[45] Date of Patent: Jun. 7, 1994

[54] CARBON-CONTAINING CARBON BONDED REFRACTORIES WITH IMPROVED PHYSICAL PROPERTIES

[75] Inventors: David R. Sundell, Pittsburgh; Dwight S. Whittemore, Bethel Park, both of Pa.

[73] Assignee: Indresco Inc., Dallas, Tex.

[21] Appl. No.: 36,151

[22] Filed: Mar. 24, 1993

[51] Int. Cl.$^5$ .............................................. C04B 35/52
[52] U.S. Cl. .................................... 501/100; 501/101; 501/109
[58] Field of Search ......................... 501/100, 101, 109

[56] References Cited

U.S. PATENT DOCUMENTS 4,306,030 12/1981 Watanabe et al. .
4,471,059 9/1984 Yoshino et al. .
4,540,675 9/1985 Morris et al. .
4,605,635 8/1986 Zenbutsu et al. .
4,912,068 3/1990 Michael et al. .
4,957,887 9/1990 Michael et al. .

FOREIGN PATENT DOCUMENTS 60-108362 6/1985 Japan .
127124 5/1989 Japan .

Primary Examiner—Karl Group
Attorney, Agent, or Firm—John L. Sigalos

[57] ABSTRACT

Carbon-containing carbon bonded refractory mixes and products made therefrom in which the refractory is a magnesite or high alumina aggregate and containing a silica-free elemental boron containing B-Mg-O alloy powder containing at least 95% B-Mg-O. and shapes made therefrom. The invention also involves the method of increasing the lining life of a metallurgical vessel utilizing unburned brick made from the above-noted mixes.

25 Claims, 1 Drawing Sheet

CARBON-CONTAINING CARBON BONDED REFRACTORIES WITH IMPROVED PHYSICAL PROPERTIES

BACKGROUND OF THE INVENTION

The present invention relates to carbon-containing refractories and, in particular, magnesite-carbon refractory brick suitable for use in metal processing equipment, especially basic oxygen furnaces (BOF) and other metallurgical vessels wherein the principal mode of wear of the refractory brick lining is slag attack and where hot strength and high slag resistance of refractory linings are required. Furthermore, this invention is applicable to unburned alumina-carbon refractories such as those used in slide gates and shroud tubes which control the flow of molten steel in the continuous casting process in which properties comparable to shapes containing $B_4C$ are desired.

There is abundant prior art dealing with the use of metals in carbon-containing refractories. Essentially, the purpose of these metals is to act as oxygen "getters" which combine with free oxygen before the oxygen can consume carbon in the refractory. Another purpose of the powdered metals is to form, under certain conditions, stable carbide phases which decrease the permeability of the refractory and increase its strength. U.S. Pat. No. 4,306,030 discloses the use of aluminum, silicon, and magnesium metal powders. These metals increase the oxidation resistance of the refractory and have the effect of lowering the permeability of the brick which makes the entrance of oxidizing gases into the refractory more difficult. It is also known that these metals can be effective if used individually or in combination or as alloys in various combinations.

Prior art also discloses the use of various carbides and nitrides either used individually or in combination with the three primary metals, silicon, aluminum, or magnesium. The purpose of these carbides (such as $B_4C$ or SiC) or nitrides (such as BN or $Si_3N_4$) is to increase the hot strength or corrosion resistance. U.S. Pat. No. 4,471,059, for example, teaches the addition of 0.3 to 5% $B_4C$ to a carbon-containing refractory which contains metal additions such as Al, Si, Cr, or Ni. U.S. Pat. No. 4,540,675 teaches the use of 1-10 wt. % $B_4C$ as an antioxidant. $B_4C$ is effective because it has a relatively high affinity for oxygen and oxidizes to an oxide. This oxide then in turn reacts with magnesia, silica or a silicate to produce a viscous glass film in the refractory which further decreases the permeability of the refractory. U.S. Pat. No. 4,605,635 shows the use in carbon-containing refractories of $SiB_6$. The boron portion oxidizes to $B_2O_3$, which then reacts with magnesia, the silicon portion which also oxidizes to a silicate and reacts with magnesium borate to form a lower melting liquid. While the carbonaceous material is better protected against oxidation, the presence of the silicate results in low and undesirable hot strengths due to reaction thereof with lime or calcium silicate impurities in the refractory resulting in very low melting fluid lime-magnesia-borosilicates. This low strength causes the refractories to be prone to accelerated wear.

SUMMARY OF THE INVENTION

It is the object of this invention to provide carbon-containing brick of improved physical properties compared to prior art and carbon-containing shapes which do not contain additions of $B_4C$, but have comparable physical properties to those shapes containing $B_4C$.

Briefly stated, the present invention comprises a mix for forming a refractory comprising at least about 70 wt. % of a magnesite or high alumina aggregate, a carbon, a silica-free elemental boron containing B-Mg-O alloy powder in an amount up to about 10 wt. %, and for each 100 wt. % thereof, from about 1 to 6 wt. % of a carbonaceous bonding agent, said magnesite containing at least 95% MgO, said alumina aggregate containing at least about 47.5% alumina, said carbon containing at least 90% carbon, and said alloy containing at least 95% B+Mg+O.

The present invention also particularly comprises a magnesite-carbon mix for forming a refractory comprising about 70% to 97% wt. % magnesite, about 3 to 30 wt. % of a carbon, less than 10 wt. % metallic additive (such as aluminum powder) and 0.05 to 10 wt. % of a silica-free elemental boron containing B-Mg-O alloy powder and for each 100 wt. % of said magnesite, carbon and alloy from about 1 to 5 wt. % of a carbonaceous bonding agent, said magnesite containing at least about 95% MgO, and said carbon containing at least 90% carbon, and said alloy containing at least 95% B+Mg+O.

The present invention further comprises an alumina-carbon mix comprising about 70 wt. % or more high alumina aggregate, less than 10 wt. % of a carbon, less than 10 wt. % metallic additive (such as aluminum powder) and 0.05 to 10 wt. % of a silica-free elemental boron containing B-Mg-O alloy powder and for each 100 wt. % of said alumina, carbon, and alloy from about 1 to 6 wt. % of a carbonaceous bonding agent, said alumina aggregate containing at least about 47.5% alumina, and said carbon containing at least 90% carbon, said metallic additive of at least 90% purity, and said alloy containing at least 95% B+Mg+O.

The invention also comprises the resultant refractory shapes and particularly brick and liners as well as slide gates and shroud tubes for metallurgical vessels having an increased life using said shapes as hereinafter set forth.

BRIEF DESCRIPTION OF THE DRAWING

The single figure of the drawing is a graph showing oxidation resistance of various mixes.

DETAILED DESCRIPTION

Figure 1:
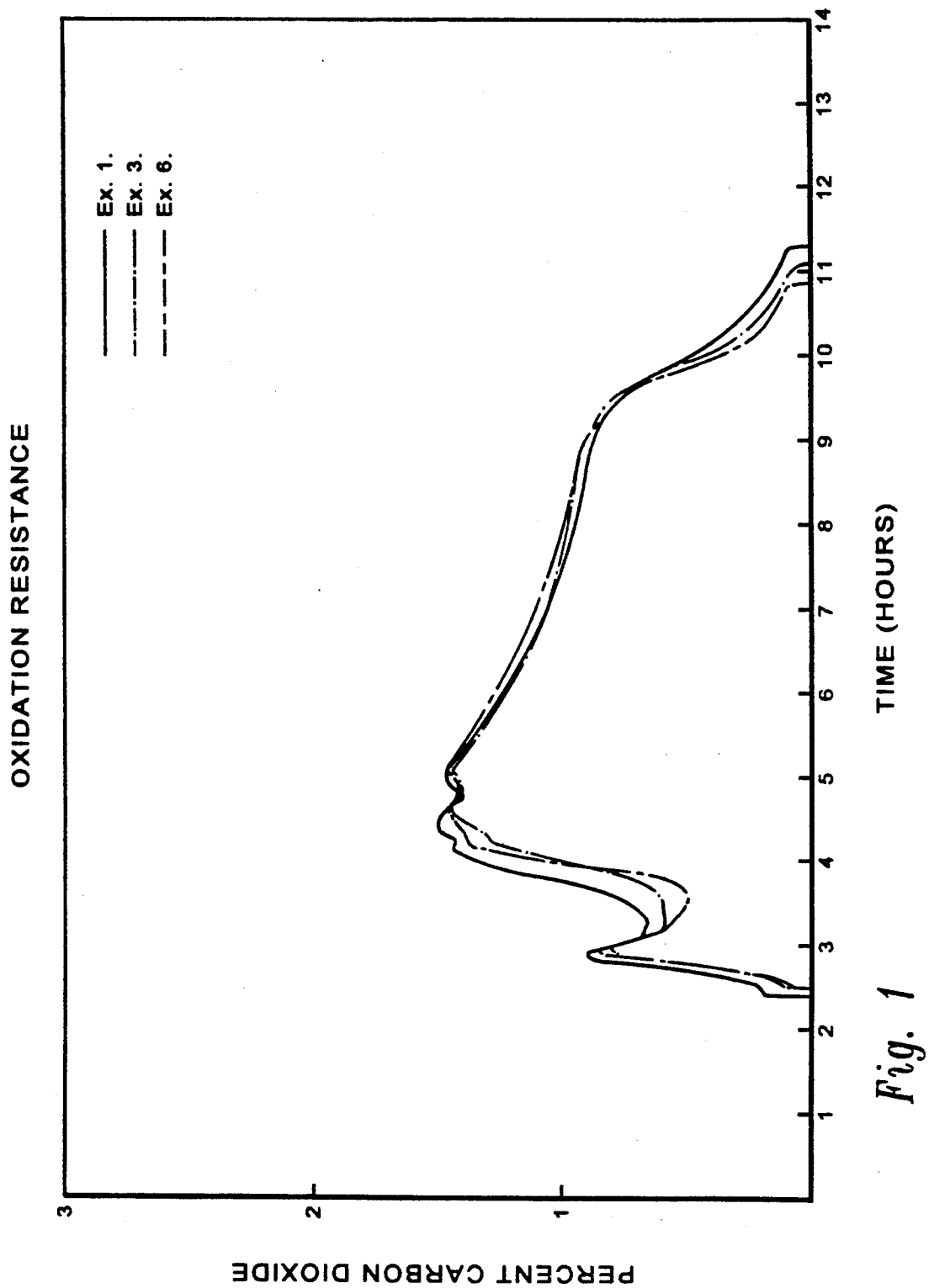

The essential component of the instant invention is the B-Mg-O alloy.

As to the alloy, a variety of types containing elemental boron may be used. One specific alloy found to be effective consists of about 46% amorphous boron and the balance magnesium borate. Chemically, this alloy assays about 52% boron, 21% magnesium, and 27% oxygen. Another alloy consists of about 10% amorphous elemental boron and 90% magnesium borate which occurs in the phases ($2MgO\ B_2O_3$) and $Mg_3(BO_3)_2$. This assays to about 20.4% boron, 34.36% magnesium, and 45.2% oxygen. The alloys should preferably contain no less than 95% B to Mg, and O and the preferred particle size of these alloys is −200 mesh. They are stable in water which is highly unusual for a material containing magnesium. These alloys do not contain any silicon or silicates and are free boric acid ($H_3BO_3$) or boron oxide ($B_2O_3$) which are known to be very detrimental to the hot strength of magnesite or MgO-C refractories.

The boron alloy may be crystalline or amorphous and contain more than 5 wt. % boron, preferably more than 10 wt. % boron. Alloys containing more than 75% or 90% boron would be considered cost prohibitive and may have too great a tendency to oxidize forming an excess of a compound like boron oxide ($B_2O_3$) which in large amounts can be detrimental to the refractories of the system.

The preferred level of alloy addition to MgO-C refractory brick mixes is from 0.1 to 1.0 wt. %. At these low levels, improvements in coked porosity, abrasion resistance after firing to 2000° F. and strength at 1500° F. are obtained.

As to such MgO-C refractory mixes, they must contain at least 95% MgO, either deadburned, fused, or a combination thereof, have minimal silica, lime, and boron oxide impurities and have preferably a CaO/$SiO_2$ weight ratio above about 2.

As used herein, the term "a carbon" refers to any carbonaceous material containing at least about 90% carbon. Flake graphite having a carbon content of at least 90% is preferred or a mixture of such graphite with carbon black, calcined coke, or other suitable forms of carbon. Conceivably, flake graphite could be eliminated from the mix and carbon black, calcined coke, or other suitable forms of carbon could be added as substitutes.

With respect to the proportion of materials, there should be utilized from about 8 to 30 wt. % carbon, the bulk of which preferably is in the form of flake graphite, an optional addition of 0.1 to 8 wt. % metal powder consisting of aluminum, magnesium, or silicon either used individually or in combination, a required addition of said boron alloy ranging from 0.05 to 10 wt. %, an optional addition of a carbide such as boron carbide or silicon carbide or a nitride such as boron nitride or silicon nitride ranging from 0.1 to 8 wt. % and the balance of the mix a relatively high purity deadburned magnesite having a magnesia content of at least 95%.

The particle size or the graded size of the deadburned magnesite and the flake graphite is not critical; it should be that conventionally used in making this type of brick.

As to the aluminum, magnesium, and silicon powders or alloy combinations thereof the particle size is not critical and, again, it can be of a graded size conventionally used in making metal-containing brick. It is critical not to permit the metal amounts to get too high in order to avoid the possibility of fluxing action that may be caused by oxidized aluminum and increased porosity that can be caused by volatilized magnesium.

As to the optional carbides and nitrides they may be of any size, preferably −65 mesh, that are conventionally used in refractory brick.

Also included in the mix must be a carbonaceous bonding agent that yields high levels of carbon during pyrolysis, i.e., over 35 wt. % carbon. Examples are any novolak or resol resin, tar, pitch or mixtures thereof. At the temperatures at which these brick are used, these materials are decomposed and the resulting carbon char acts to bind the brick. The amounts of binder are not critical, but it is desired to avoid high binder levels in order to prevent cracking of the shape and to maintain adequate handling strength at the press. Ordinarily, about 1.5 to 6 wt. %, preferably 2.5 to 4 wt. %, of such bonding agent is added for each 100% by weight of the mix.

The method of forming the brick is not critical in that the components noted above can simply be admixed, pressed into shape using typical brick-making presses, and then baked at about 250°-550° F. to form unburned brick which are then used to form linings for metallurgical vessels. Optionally, the brick may be tar impregnated. In use, the brick are exposed to high temperatures under reducing conditions which forms carbon bonded brick of improved physical properties.

The brick of the present invention are particularly suitable as linings for basic oxygen furnaces.

The brick of the present invention are made to the size and shape required to form the entire lining or a portion of the lining of any shape metallurgical vessel. The linings are formed in the conventional manner by using brick, ramming mix, vibration cast mixes, or castables which contain this special boron alloy.

As to the high alumina aggregate, it is necessary that it contain at least 47.5% alumina and comprise at least 70 wt. % of the mix. The aggregate may be calcined or fused. The preferred aggregate is tabular alumina which typically contains about 99% alumina. The size of the high alumina aggregate is not critical but should be of a graded size typically used in brick making.

The preferred carbon for use with the high alumina aggregate is in the form of −150 mesh coke or carbon black in amounts less than 5 wt. %, preferably less than 4 wt. %.

The preferred metallic addition for the high alumina aggregate mix is aluminum, sized −28 mesh, in amounts less than 10 wt. %, preferably less than 5 wt. % of the mix.

As to the boron alloy used with the high alumina aggregate mix, both types which were previously described may be employed in amounts previously stated. However, to maximize hot strength at 1500° F. use of the higher boron alloy (B=46%) is preferred. The mix may contain an optional carbide or nitride, preferably −65 mesh, and in amounts less than 10 wt. %, that are conventionally used in refractory brick. This mix also contains a carbonaceous bonding agent as was previously described.

The mixes are formed into shapes such as slide gates or shroud tubes by adding the admixed components to the desired molds and pressing the shapes. After removal from the mold the shapes are cured and may be optionally tar impregnated and then baked under reducing conditions to remove the bulk of the volatiles from the tar.

The invention will be further described in connection with the following examples which are set forth for purposes of illustration only.

EXAMPLES 1 TO 7

A series of seven MgO-C compositions were made using the components and proportions as set forth in Table I below. The brick were made by pressing at about 18,000 psi and then cured using a curing schedule of 100° F./hr. to 350° F. with a three hour hold, and then tested for the usual physical properties as set forth in Table I.

TABLE I

| | Effect of Special Boron Alloy Compared to B₄C | | | | | | |
|---|---|---|---|---|---|---|---|
| Example | 1 | 2 | 3 | 4 | 5 | 6 | 7 |
| Mix: | | | | | | | |
| Deadburned Magnesite | 81.0% | 80.9% | 80.75% | 80.5% | 80.9% | 80.75% | 80.5% |
| Flake Graphite | 17.0 | 17.0 | 17.0 | 17.0 | 17.0 | 17.0 | 17.0 |
| Aluminum Powder | 2.0 | 2.0 | 2.0 | 2.0 | 2.0 | 2.0 | 2.0 |
| Boron Carbide Powder | — | 0.1 | 0.25 | 0.5 | — | — | — |
| Special Boron Alloy Powder (46% B) | — | — | — | — | 0.1 | 0.25 | 0.5 |
| Phenolic Resin | | | | 3.7 | | | |
| Bulk Density at Press, pcf | 183 | 183 | 183 | 183 | 183 | 182 | 182 |
| Bulk Density After Baking, pcf | 181 | 180 | 180 | 179 | 180 | 180 | 180 |
| Data From Porosity (After Coking) | | | | | | | |
| Bulk Density, pcf | 173 | 173 | 173 | 172 | 173 | 174 | 174 |
| Apparent Porosity, % | 9.4 | 9.4 | 8.7 | 8.8 | 8.9 | 8.2 | 8.0 |
| Apparent Specific Gravity | 3.06 | 3.06 | 3.04 | 3.03 | 3.05 | 3.03 | 3.02 |
| Modulus of Rupture, psi | | | | | | | |
| At 1500° F.[1] | 20 | 20 | 110 | 150 | 60 | 260 | 330 |
| At 2000° F.[2] | 2250 | 2340 | 2380 | 2740 | 2540 | 2860 | 2610 |
| Crushing Strength at 280° F.[2] | 4270+ | 5030+ | 4830+ | 4100+ | 5700+ | 4450+ | 4560+ |
| Number of Samples that Broke in Test | 3 | 2 | 0 | 0 | 3 | 0 | 1 |
| Modified ASTM C-704 Abrasion Test After 2000° F. Reheat[1,3] Volume Eroded, cc: | 68 | 60 | 54 | 48 | 50 | 47 | 40 |

[1]Oxidizing Atmosphere
[2]Reducing Atmosphere
[3]500 grams of SiC were used
+Indicates a strength that is greater than what is shown A comparison of mixes 1 to 4 indicate that additions of 0.1 to 0.5 wt. % fine boron carbide to an aluminum-containing magnesite brick of the 20% carbon class, as taught by prior art, resulted in slightly progressive decreases in apparent porosity after coking, slight increases in strength at 1500° F., and a noticeable improvement in resistance to crushing at 2800° F. which is reflected in fewer samples breaking in the crushing test as the amount of B₄C increases. This series also showed a modest improvement in abrasion resistance after being heated to 2000° F.

A comparison of mix 1 with mixes 5, 6, and 7, which define our invention, shows the effect of adding 0.1 to 0.5 wt. % boron alloy powder. This addition has a more dramatic effect than boron carbide on decreasing apparent porosity. As little as 0.5 wt. % boron alloy decreases apparent porosity 1.4% which is considered significant. In addition, this additive clearly produces better strength at 1500° F. under oxidizing conditions than what is produced by an equivalent amount of boron carbide. This suggests that a pressed shape containing this boron alloy may have better oxidation resistance than a mix containing B₄C as more of the bond is retained after this test. As little as 0.25% of boron alloy appears to produce higher strength at 2000° F. as does 0.25 or even 0.5 wt. % boron carbide. This special alloy, like B₄C, also produces the desirable tendency of increased strength at 2800° F. as reflected by a decrease in the number of test samples which broke during the crushing test. More significantly, increasing amount of the special boron alloy clearly increased the abrasion resistance of the shapes after heating to 2000° F. This too may reflect an increase in oxidation resistance for pressed shapes containing the boron alloy.

EXAMPLES 8 TO 10

An additional test was conducted to contrast the difference between mixes containing boron carbide and mixes that contain the boron alloy. To accomplish this ⅞" diameter, 2" long samples of cured brick made of the mixes of Examples 1, 3, and 6, respectively, shown in Table I were exposed to 1.5% oxygen in argon in a furnace which was heated at 500° F./hr. to 2000° F. with a hold time of 4 hrs. As carbon burned, all forms of carbon and oxygen were converted to carbon dioxide by passing the gases over cupric oxide (CuO) and detecting the amount of carbon dioxide formed by using an infra-red $CO_2$ analyzer. FIG. 1 shows that the mix with the boron alloy tended to produce the least loss of carbon especially between the third and fourth hour of combustion. However, at the end of the test (Table II) the sample with the boron alloy imparted essentially the same oxidation resistance as the mix containing boron carbide. These results stand in contrast to the 1500° F. MOR test and the abrasion test which indicated a possible improvement in oxidation resistance.

TABLE II

| | Weight Changes During Oxidation Test | | |
|---|---|---|---|
| Example | 8 | 9 | 10 |
| Initial Weight (g) | 27.5887 | 27.7673 | 28.1019 |
| Final Weight (g) | 25.4926 | 25.7417 | 26.0710 |
| Weight Loss (g) | 2.0961 | 2.0256 | 2.0309 |
| Weight Loss (%) | 7.6 | 7.3 | 7.2 |

It is not clearly understood why this boron alloy provides improved intermediate strength and lower porosity compared to similar mixes containing boron carbide. It is speculated that at these intermediate temperatures a viscous boron-magnesium-oxide glass forms which lowers the apparent porosity and produces a secondary bond which imparts into the shape higher strength. Apparently, the high temperature properties of this glassy phase is quite exceptional as evidenced by the high strength values at 2800° F.

EXAMPLES 11 AND 12

High alumina mixes were made, one containing the boron alloy and another containing boron carbide. The mixes were made in the conventional manner used to make slide gates. The batches were mixed with resin and then pressed. The slide gates were cured to harden the resin binder and then the plates were tar impregnated followed by baking at 1000° F. The mix formulations, processing conditions, and test results are set forth in Table III below.

As shown by the data the addition of 1% boron alloy for 1% boron carbide resulted in essentially equivalent physical properties.

TABLE III

Resin Bonded Alumina-Carbon Mixes

| Example | 11 | 12 |
|---|---|---|
| Mix: | | |
| Sintered Alumina, 6/10 mesh | 10% | 10% |
| Sintered Alumina, 10/24 | 36 | 36 |
| Sintered Alumina, 24/48 | 10 | 10 |
| Sintered Alumina, −48 | 15 | 15 |
| Sintered Alumina, −325 | 12 | 12 |
| Reactive Alumina, −325 | 10 | 10 |
| Aluminum Powder | 3 | 3 |
| Fine Coke, 65/375 | 2 | 2 |
| Carbon Black, −325 | 1 | 1 |
| Boron Carbide | 1 | — |
| Boron Alloy (B = 46%) | — | 1 |
| Plus Addition | 3.7 | 3.7 |
| Resin | | |
| Forming Pressure, psi | 15,000 | |
| Bulk Density at Press, pcf | 197 | 196 |
| Cured at 350° F., 4 hrs. | | |
| Tar Impregnated, Baked at 1000° F., 4 hrs. | | |
| Bulk Density, pcf | 195 | 195 |
| Apparent Porosity, % | 7.8 | 8.5 |
| Apparent Specific Gravity | 3.39 | 3.41 |
| Modulus of Rupture, psi | | |
| At Room Temperature, (Av. 3) | 2990 | 2540 |
| At 1500° F. (oxidizing) (Av. 2) | 1910 | 1510 |
| At 2000° F. (reducing) (Av. 3) | 4600 | 5130 |
| Modulus of Elasticity, $\times 10^6$ psi | 10.9 | 10.3 |

As shown by the data the addition of 1% boron alloy for 1% boron carbide resulted in essentially equivalent physical properties.

All the mesh sizes set forth herein are Tyler mesh sizes.

While the invention has been described in connection with a preferred embodiment, it is not intended to limit the scope of the invention to the particular form set forth, but, on the contrary, it is intended to cover such alternatives, modifications, and equivalents as may be included within the scope of the invention as defined by the appended claims.

What is claimed is:

1. A carbon-containing refractory mix comprising at least about 70 wt. % of a magnesite or high alumina aggregate, a carbon containing material, a silica-free elemental boron containing B-Mg-O alloy powder in an amount up to about 10 wt. %, and for each 100 wt. % thereof, from about 1 to 6 wt. % of a carbonaceous bonding agent, said magnesite containing at least about 95% MgO, said alumina aggregate containing at least about 47.5% alumina, said carbon containing material containing at least about 90% carbon, said alloy containing at least 95% B+Mg+O.

2. The mix of claim 1 wherein said mix contains about 70 to 97 wt. % of magnesite containing at least 95 wt. % magnesia and is either deadburned, fused or a combination thereof, said carbon containing material is flake graphite in an amount of about 3 to 30 wt. %, and said alloy powder is present in an amount of 0.05 to 10 wt. %.

3. The mix of claim 2 wherein said flake graphite is replaced by carbon black or calcined coke in amounts up to 100% of the total flake graphite content.

4. The mix of claim 3 wherein said boron alloy contains at least 95 wt. % boron, magnesium, and oxygen in the form of amorphous or crystalline boron and magnesium borate, the boron content of the alloy being in range of about 5 to 75 wt. %, and the particle size of the alloy powder is −200 mesh.

5. The mix of claim 4 also containing aluminum, silicon, magnesium, boron carbide, boron nitride, silicon carbide, silicon nitride, or combinations thereof in an amount up to 10 wt. %.

6. The mix of claim 5 wherein said carbonaceous binder is a novolak resin, a resole resin, tar, pitch, or mixtures thereof.

7. An unburned magnesite-carbon refractory shape consisting essentially of the mix of claim 1 formed into a shape and baked.

8. The refractory shape of claim 7 wherein said mix contains about 70 to 97 wt. % of a magnesite containing at least 95 wt. % magnesia and is either deadburned, fused or a combination thereof, said carbon containing material is graphite in an amount of about 3 to 30 wt. %, and said alloy powder is present in an amount of 0.05 to 10 wt. %.

9. The refractory shape of claim 8 wherein said flake graphite is replaced by carbon black or calcined coke in amounts up to 100% of the total flake graphite content.

10. The refractory shape of claim 9 wherein said boron alloy contains at least 95 wt. % boron, magnesium, and oxygen in the form of amorphous or crystalline boron and magnesium borate, the boron content of the alloy being in range of about 5 to 75 wt. %, and the particle size of the alloy powder is −200 mesh.

11. The refractory shape of claim 10 wherein said mix also contains aluminum, silicon, magnesium, boron carbide, boron nitride, silicon carbide, or silicon nitride, or combinations thereof in an amount up to 10 wt. %.

12. The refractory shape of claim 11 wherein said carbonaceous binder is a novolak resin, a resole resin, tar, pitch, or mixtures thereof.

13. An unburned refractory brick consisting essentially of the mix of claim 1 formed in the shape of a brick and baked.

14. The brick of claim 13 wherein said mix contains about 70 to 97 wt. % of a magnesite containing at least 95 wt. % magnesia and is either deadburned, fused or a combination thereof, said carbon containing material is flake graphite in an amount of about 3 to 30 wt. %, and said alloy powder is present in an amount of 0.05 to 10 wt. %.

15. The brick of claim 14 wherein said flake graphite is replaced by carbon black or calcined coke in amounts up to 100% of the total flake graphite content.

16. The brick of claim 15 wherein said boron alloy contains at least 95 wt. % boron, magnesium, and oxygen in the form of amorphous or crystalline boron and magnesium, borate, the boron content of the alloy being in range of about 5 to 75 wt. %, and the particle size of the alloy powder is −65 mesh.

17. The brick of claim 16 wherein said mix also contains aluminum, silicon, magnesium, boron carbide, boron nitride, silicon carbide, or silicon nitride, or combinations thereof in an amount up to 10 wt. %.

18. A refractory brick lining for metallurgical vessels consisting essentially of a plurality of unburned magnesite-carbon brick, said brick consisting of the brick of any one of claims 14 to 17.

19. A method of increasing the lining life of metallurgical vessels comprising forming a lining in said vessels using a plurality of unburned magnesite-carbon brick consisting essentially of the brick of any one of claims 14 to 17 and subsequently burning said brick in-situ within the vessel.

20. The mix of claim 1 wherein said alumina aggregate is tabular alumina containing about 99% alumina, said carbon containing material is coke, carbon black, or a mixture thereof in an amount less than 5 wt. %, and said alloy powder contains at least about 46% B.

21. The mix of claim 20 also containing aluminum, silicon, magnesium, boron carbide, boron nitride, silicon carbide, or silicon nitride, or combinations thereof in an amount up to 10 wt. %.

22. The mix of claim 21 wherein said carbonaceous binder is a novolak resin, a resole resin, tar, pitch, or mixtures thereof.

23. An unburned alumina aggregate-carbon refractory shape formed by shaping and baking the mix of any one of claims 20 to 22.

24. The refractory shape of claim 23 in the form of a slide gate.

25. The refractory shape of claim 23 in the form of a shroud tube.

* * * * *